July 7, 1931.  M. J. ROCHE  1,813,424
HOLDER FOR SCREW THREADED ARTICLES
Filed Nov. 9, 1929

Inventor.
Michael J. Roche
by Heard Smith & Tennant
Attys.

Patented July 7, 1931

1,813,424

UNITED STATES PATENT OFFICE

MICHAEL J. ROCHE, OF WATERTOWN, MASSACHUSETTS, ASSIGNOR OF ONE-HALF TO GUSTAVE A. GABULSON, OF JAMAICA PLAIN, MASSACHUSETTS

HOLDER FOR SCREW-THREADED ARTICLES

Application filed November 9, 1929. Serial No. 405,943.

This invention relates to a clamp or holder for holding screw-threaded articles while screwing them into or out of another screw-threaded article.

As illustrating one use to which the invention may be put I would refer to its use in screwing a nipple into a pipe or unscrewing it therefrom.

It is sometimes desirable to screw a nipple into another pipe but without special tools this operation cannot easily be performed because an ordinary pipe wrench cannot be applied to the nipple without injuring the threads.

My invention provides a novel grip or holder for a nipple or any other exteriorly screw-threaded article which will grip the article with sufficient firmness so that the device can be used to screw the article into or out from another screw-threaded article.

In order to give an understanding of the invention I have illustrated in the drawings a selected embodiment thereof which will now be described after which the novel features will be pointed out in the appended claims.

The invention is adapted for use as a holder for exteriorly screw-threaded articles of various kinds and simply as illustrating one use to which the invention can be put I have shown it as used in screwing a nipple into or unscrewing it from another pipe.

Figure 1:
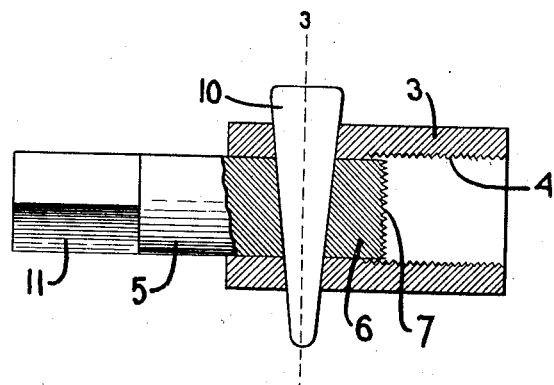
Fig. 1 is a view partly in section of a device embodying my invention.
Figure 2:
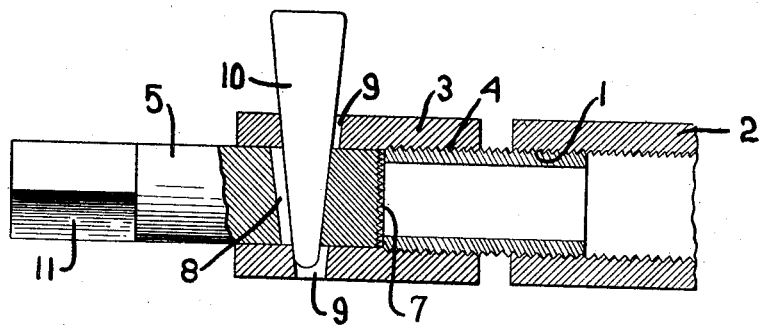
Fig. 2 shows the manner in which the device is used.
Figure 3:
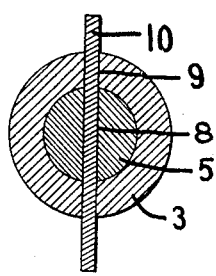
Fig. 3 is a section on the line 3—3, Fig. 2.
Figure 4:
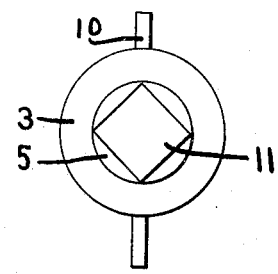
Fig. 4 is an end view of the device embodying my invention.

In Fig. 2, 1 indicates a nipple and 2 is a pipe into which the nipple is screwed.

My improved holder or clamp for the nipple comprises a sleeve member 3 having interior screw threads 4 at one end adapted to screw onto the nipple 1 or other exteriorly screw-threaded article. Associated with the sleeve is a clamping member 5 in the form of a bar which extends into the sleeve, the end 6 of the bar being provided with suitable serrations 7. Both the clamping member 5 and the sleeve 3 are provided with tapered openings, the opening in the clamping member being indicated at 8 and that in the sleeve at 9. The openings are designed to receive a wedge or tapered pin 10 as shown in the drawings.

The device may be used as follows. The pin 10 may be withdrawn and the sleeve 3 screw threaded to the end of the nipple 1 or other screw-threaded article. The clamping member 5 is then inserted into the sleeve until its serrated end 7 engages the end of the nipple and the tapered pin will then be driven into the apertures 8 and 9.

The sleeve should be screwed onto the nipple to such an extent that when the clamping member 5 is assembled with the sleeve the end 7 will engage the end of the nipple or other screw-threaded article before the apertures 8 and 9 come into complete alignment so that when the tapered pin is driven home it will force or wedge the clamping member 5 toward the screw-threaded article 1 and cause the serrated face 7 to bear against the end of the nipple or screw-threaded article with considerable pressure. The pressure of the clamping member against the screw-threaded article caused by the driving in of the tapered pin develops a binding pressure between the exterior screw threads of the article 1 and the interior screw threads 4 of the sleeve 3 so that the sleeve will be firmly locked to the screw-threaded article.

The clamping member 1 is provided with a square or wrench-receiving portion 11 to which a wrench may be applied and because of the manner in which the sleeve is locked to the screw-threaded article 1 any turning movement given to the clamping member 5 will be transmitted to the article 1 so that the device can be used for screwing an article into or unscrewing it from a screw-threaded recess.

The clamp or holder can be readily removed from the article 1 by simply driving the tapering pin 10 out of the apertures 8 and 9 and then unscrewing the sleeve 3 from the article 1. The removal of the pin 10 relieves the clamping pressure of the member 5 against the end of the article 1 and also relieves the clamping pressure between the screw threads of the article 1 and the interior screw threads 4 of the sleeve 3 so that the sleeve can then be freely unscrewed.

The device is extremely simple in construction but is very effective in operation and can be quickly and easily applied to any article 1 or removed therefrom. It also has the advantage that it is relatively inexpensive to manufacture.

I claim:

1. A holder or clamp for exteriorly screw-threaded articles comprising a sleeve member having interior screw threads at one end and adapted to be screw threaded to said article, a clamping member entering the sleeve member axially from the other end and adapted to bear against the end of said article, and means co-operating with the clamping member and the sleeve to force the end of the clamping member against the end of the screw-threaded article and to cause the screw-threads of the sleeve to have a binding engagement with the screw threads of said article, the clamping member projecting beyond the sleeve member and the projecting portion having flat sides to receive a wrench.

2. A holder or clamp for exteriorly screw-threaded articles comprising a sleeve member having at one end interior screw threads adapted to be screw threaded to said article, a clamping member extending axially into the sleeve member from the other end thereof and adapted to engage the end of the screw-threaded article to which the sleeve member is screw threaded, and a wedge member acting on the sleeve and clamping member and tending to force the clamping member axially in a direction toward the screw-threaded article and the sleeve axially in an opposite direction, whereby the end of the clamping member will be clamped against the end of the screw-threaded article and the screw threads of the sleeve will have a binding engagement with the screw threads of said article, the clamping member projecting beyond the sleeve member and the projecting portion having flat sides.

In testimony whereof, I have signed my name to this specification.

MICHAEL J. ROCHE.